Patented Oct. 19, 1948

2,451,664

UNITED STATES PATENT OFFICE 2,451,664

ORGANO-DISILOXANE AND METHODS OF PREPARING IT

William Herbert Daudt, Corning, N. Y., assignor to Corning Glass Works, Corning, N. Y., a corporation of New York No Drawing. Application August 9, 1945, Serial No. 609,919

1 Claim. (Cl. 260—448.2)

This invention relates to a new and useful composition of matter and its preparation, and, more particularly, to an organo-disiloxane and methods of making it.

The present application is a continuation-in-part of my copending application, Serial Number 481,152, filed March 30, 1943, and assigned to the assignee of the present invention.

For many hydraulic and damping applications it would be desirable to have as the hydraulic or damping medium a liquid which possesses high thermal stability; resistance to oxidation at high temperatures; little change of viscosity with temperature; low pour point; high flash point; low volatility; low hydroscopicity; little or no corrosion or decomposing effect upon metal or rubber; and little or no gasification or solidification tendencies under the higher or lower temperature conditions encountered in various types of applications. Most liquids actually used in such applications represent a compromise so far as the above properties are concerned.

The primary object of the present invention is to provide a liquid which possesses properties rendering it especially adapted for use as a hydraulic or damping medium over a temperature range of —75° C. to at least 200° C. Other objects and advantages will become apparent from the following description and claim.

I have discovered a liquid composition which possesses to a remarkable extent the desirable properties listed above. This liquid is pentamethylphenyldisiloxane having the structural formula

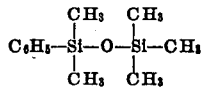

It boils at 206° C. at atmospheric pressure (760 mm.) and has a melting point below —80° C. Its viscosity at 25° C. is 1.3 centistokes. Compared to conventional hydraulic oils of the hydrocarbon type it exhibits relatively little change in viscosity with temperature. When exposed to air at elevated temperatures for long periods of time it undergoes little or no change due to oxidation. It shows little absorption of water in the presence of water vapor. Rubber and metals are not appreciably affected by it.

The following examples illustrate methods of preparing the compound of my invention.

Example 1

Bis-phenyldimethylsilicyl oxide (also known as symmetrical tetramethyldiphenyldisiloxane) (B. P. 295° C./760 mm.) and bis-trimethylsilicyl oxide (also known as hexamethyldisiloxane) (B. P. 98.5° C./760 mm.) were saturated with dry hydrogen chloride and then allowed to stand for one day. After washing with water the solution was distilled. The distillation curve showed the presence of a small amount of a new compound which possessed a boiling point intermediate between those of the starting materials. To this mixture was added approximately three times its volume of anhydrous ethyl ether and a small amount of calcium chloride. When the dry ether solution was saturated with dry hydrogen chloride a considerably larger quantity of the gas was dissolved. After standing three days the solution was washed with water and then distilled. On distillation there was then obtained a large proportion of the new compound which was shown by analysis to be pentamethylphenyldisiloxane, also known as phenyldimethylsilicyl trimethylsilicyl oxide (B. P. 206° C./760 mm.).

Example 2

Pentamethylphenyldisiloxane may also be obtained from a mixture of ethoxydimethylphenylsilane and ethoxytrimethylsilane in substantially equimolar proportions by hydrolyzing the mixture with aqueous hydrochloric acid, washing and distilling the reaction mixture. If desired, a mixture of the corresponding chlorosilanes may be employed instead of the ethoxysilanes and similar results will be obtained.

Example 3

To 1.00 g. (0.010 mole) of 96% sulfuric acid was added slowly 81.16 g. (0.500 mole) of hexamethyldisiloxane in small portions. Most of the disiloxane remained in a separate phase, even when it was warmed to 60° C. Next, an equal molecular quantity (143.23 g.) of sym.-tetramethyldiphenyldisiloxane was added to the mixture at room temperature. The mixture was stirred vigorously for a week. After the dark acid drops had settled the siloxane phase was clear and colorless. Following decanting and rinsing with several milliliters of hexamethyldisiloxane, the siloxanes were treated with excess gaseous ammonia. Ammonium sulfate precipitated slowly, was filtered and rinsed with hexamethyldisiloxane after standing overnight. The slightly ammoniacal filtrate was fractionally distilled through a 2½ ft. column containing ¼ in. glass helices and through a Corad head using a 1:5 reflux ratio.

Inspection of the distillation data showed that the mixed disiloxane $(C_6H_5)(CH_3)_2SiOSi(CH_3)_3$ was a major product and was shown by analysis to be present in a pure state in the fraction boiling between 108° and 110° C. at 29 mm. The presence of tri- and tetra-siloxanes formed by cleavage of some of the phenyl groups in certain of the distillate fractions was also established. Such compounds contained dimethylsiloxane units and were higher boiling and of higher silicon content than the disiloxanes containing the same number of phenyl groups. These by-products probably included octamethyl-, heptamethylphenyl- and hexamethyldiphenyltrisiloxanes, formed by combined dephenylation and redistribution. For example a fraction boiling between 116° and 119° C. at 12 mm. was shown by analysis to be essentially

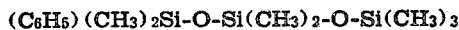

$(C_6H_5)(CH_3)_2Si-O-Si(CH_3)_2-O-Si(CH_3)_3$

*Example 4*

A mixture of 7.2 g. of bis-phenyldimethylsilicyl oxide and 20.3 g. of bis-trimethylsilicyl oxide was allowed to stand 24 hours at room temperature with 1 g. of potassium hydroxide dissolved in 23 g. of 95% ethanol. The solution was then washed with water. Distillation gave some of the starting dimeric silicon compounds and, in addition, a compound which possessed an intermediate boiling point of 206° C. at 760 mm. Analysis established it to be the unsymmetrical oxide, pentamethylphenyldisiloxane.

In view of the wide range of temperatures, namely, −80° C. to 206° C. over which the disiloxane of this invention remains substantially unchanged, it is eminently adapted for use as a damping fluid for vibrating members or as a hydraulic fluid for fluid pressure actuatable devices. However, other uses than those of hydraulic applications exist for which such a composition is urgently needed. These are thermoresponsive fluids, heat transfer liquids and constant temperature media.

I claim:
Pentamethylphenyldisiloxane.

WILLIAM HERBERT DAUDT.

REFERENCES CITED

The following references are of record in the file of this patent:

UNITED STATES PATENTS

| Number | Name | Date |
|---|---|---|
| 2,377,689 | Hyde | June 5, 1945 |
| 2,386,441 | Daudt | Oct. 9, 1945 |
| 2,398,187 | McGregor et al. | Apr. 9, 1946 |

FOREIGN PATENTS

| Number | Country | Date |
|---|---|---|
| 549,081 | Great Britain | Nov. 5, 1942 |

OTHER REFERENCES

I. Kipping "Journal Chem. Soc." (London) vol. 130 (1927) pages 104–107.

II. Kipping "Journal Chem. Soc." (London) vol. 99 (1911) pages 138–145.

III. Kipping "Journal Chem. Soc." (London) vol. 93 (1908) pages 198–210.